(12) United States Patent
Nair

(10) Patent No.: US 10,542,463 B2
(45) Date of Patent: Jan. 21, 2020

(54) SYSTEM AND METHOD FOR SECURE CELL REDIRECTION IN WIRELESS NETWORKS

(71) Applicant: Alcatel-Lucent USA Inc., Murray Hill, NJ (US)

(72) Inventor: Suresh Nair, Whippany, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/710,423

(22) Filed: Sep. 20, 2017

(65) Prior Publication Data
US 2018/0227809 A1 Aug. 9, 2018

Related U.S. Application Data

(60) Provisional application No. 62/454,876, filed on Feb. 5, 2017.

(51) Int. Cl.
*H04W 36/00* (2009.01)
*H04W 12/06* (2009.01)
*H04W 12/10* (2009.01)

(52) U.S. Cl.
CPC ....... *H04W 36/0022* (2013.01); *H04W 12/06* (2013.01); *H04W 12/10* (2013.01)

(58) Field of Classification Search
CPC ..... H04W 76/16; H04W 12/06; H04W 12/10; H04W 36/0022

(Continued)

(56) References Cited

U.S. PATENT DOCUMENTS

2010/0316000 A1\* 12/2010 Burbidge .......... H04W 36/0022
370/328
2013/0084829 A1\* 4/2013 De Foy ................. H04W 12/06
455/411

(Continued)

FOREIGN PATENT DOCUMENTS

WO 2016087398 A1 6/2016

OTHER PUBLICATIONS

LTE Advanced Pro, 3GPP, "3rd generation partnership project; technical specification group services and system aspects; network architecture (Release 14)." 3GPP TS 23.002 v.14.0.0, 113 pp. (Sep. 2016).

(Continued)

*Primary Examiner* — Christopher R Crompton
(74) *Attorney, Agent, or Firm* — Loza & Loza, LLP; Jessica W. Smith

(57) ABSTRACT

A mobility management entity (MME) is configured to perform cell redirection or Circuit-Switched fallback with security protocols. The MME receives an initial connection message from user equipment (UE) in an idle mode with a service request for a voice call. The MME and UE first perform an authentication procedure with the UE prior to processing of the service request by the MME. The MME generate a cell redirection command with integrity protection using an integrity key established during the authentication procedure. The MME transmits the cell redirection command with integrity protection in the payload of a signaling message to the UE. The MME may also transmit the UE its policy of security protected cell redirection in an initial attach message to the network or with a tracking area update message.

19 Claims, 12 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2014/0016614 | A1* | 1/2014 | Velev | H04W 4/70 370/331 |
| 2015/0071167 | A1* | 3/2015 | Islam | H04W 36/0027 370/328 |
| 2016/0007346 | A1* | 1/2016 | Sirotkin | H04L 5/0085 370/329 |
| 2016/0174124 | A1* | 6/2016 | Basu Mallick | H04W 36/0072 370/331 |
| 2016/0337898 | A1* | 11/2016 | Jeong | H04W 28/0289 |
| 2016/0360413 | A1* | 12/2016 | Norrman | H04W 12/12 |
| 2016/0374104 | A1* | 12/2016 | Watfa | H04W 36/0011 |
| 2017/0013453 | A1* | 1/2017 | Lee | H04W 12/04 |
| 2017/0064584 | A1* | 3/2017 | Shan | H04W 76/10 |
| 2017/0127325 | A1* | 5/2017 | Vikberg | H04L 5/0035 |
| 2017/0188280 | A1* | 6/2017 | Watfa | H04W 36/0055 |
| 2018/0199398 | A1* | 7/2018 | Dao | H04W 36/14 |
| 2018/0206080 | A1* | 7/2018 | Chen | H04W 4/06 |
| 2019/0045581 | A1* | 2/2019 | Martinez Tarradell | H04W 76/27 |

OTHER PUBLICATIONS

LTE Advanced Pro, 3GPP, "3rd generation partnership project; technical specification group services and system aspects; circuit switched (CS) fallback in evolved packet system (EPS); Stage 2 (Release 13)." 3GPP TS 23.272 v.13.4.0, 103 pp. (Jun. 2016).
LTE Advanced Pro, 3GPP, "3rd generation partnership project; technical specification group radio access network; evolved universal terrestrial radio access (E-UTRA); radio resource control (RRC); protocol specification (Release 14)." 3GPP TS 36.331 V14.1.0, 654 pp. (Dec. 2016).
LTE Advanced Pro, 3GPP, "3rd generation partnership project; technical specification group services and system aspects; 3GPP system architecture evolution (SAE); security architecture (Release 14)." 3GPP TS 33.401 V14.0.0, 152 pp. (Sep. 2016).
LTE Advanced Pro, 3GPP, "3rd generation partnership project; technical specification group services and system aspects; general packet radio service (GPRS) enhancements for evolved universal terrestrial radio access network (E-UTRAN) access (Release 14)." 3GPP TS 23.401 V14.0.0, 374 pp. (Jun. 2016).
Nokia, Alcatel-Lucent Shanghai Bell. "LTE call redirection to GERAN." 3GPP TSG-RAN WG2 Meeting #96, Reno, USA (R2-168356), 3 pp. (Nov. 14-18, 2016).
PCT/US2018/015641. International Search Report & Written Opinion (dated Mar. 27, 2018).
3GPP TS 23.272 "3rd Generation Partnership Project; Technical Specification Group Services and System Aspects; Digital cellular telecommunications system (Phase 2+) (GSM); Universal mobile telecommunications system (UMTS); LTE Circuit Switched (CS) fallback in Evolved Packet System (EPS); Stage 2." v. 3.4.0 Release 13 (Jun. 2016).
3GPP TS 23.401 "3rd Generation Partnership Project; General Packet Radio Service (GPRS) enhancements for Evolved Universal Terrestrial Radio Access Network (E-UTRAN) access." v.13.9.0 Release 13 (Jan. 2017).

* cited by examiner

SYSTEM AND METHOD FOR SECURE CELL REDIRECTION IN WIRELESS NETWORKS

RELATED APPLICATIONS

This application claims priority under 35 U.S.C. 119(e) to U.S. Provisional Application No. 62/454,876 filed Feb. 5, 2017 and entitled, "System and Method for Secure Cell Redirection in Wireless Networks," which is hereby incorporated by reference herein.

TECHNICAL FIELD

This application relates generally to wireless networks, and more specifically to cell redirection of user equipment from a first access network to a second access network.

DESCRIPTION OF RELATED ART

The statements in this section provide a description of related art and are not admissions of prior art. When a mobile operator migrates its network from a 3rd Generation (3G) system (such as a GSM circuit switched network) to a Long Term Evolution (LTE) network, both 3G and LTE may co-exist for a period of time. Since the 3G Circuit-Switched (CS) voice mechanism may be more mature and available than with LTE Voice over Internet Protocol (VoIP), an operator may consider using the 3G circuit-switched (CS) network to provide voice calls.

The 3rd Generation Partnership Project (3GPP) standard body defines certain protocols or procedures for a "fallback" mechanism to a 3G Circuit-Switched (CS) voice service. According to the 3GPP CS fallback procedure, when a mobile user connected through the LTE network has an incoming or an outgoing call, the User Equipment (UE) may fall back or switch from the LTE network to a Universal Mobile Telecommunications System (UMTS) or GSM network. For example, when the LTE/WCDMA network is busy or unable to provide service to the user equipment (UE), the LTE/WCDMA network may redirect a service request for a voice call from the UE to the GSM network. This redirect process or command is sometimes referred to as "Cell Redirection".

Unfortunately, in current LTE networks, a UE in idle mode does not have a mechanism to verify the eNodeB or the cell in which the UE is attached. The UE may not detect whether the eNodeB (eNB) is genuine since there is no messaging between the UE and the eNB. Furthermore, the eNB does not have a security context for the idle UE. As such, attacks during Cell Redirection to a GSM network are possible, e.g., by using a fake eNB.

Thus, there is a need for a remedial measure or process to provide additional security to prevent attacks during Cell Redirection.

SUMMARY

In an embodiment, a method for performing cell redirection includes receiving an initial attach request with a service request from user equipment (UE) by a first network; processing the initial attach request, wherein processing the initial attach request includes performing an authentication procedure; processing the service request from the UE; and generating a cell redirection command with integrity protection and transmitting the cell redirection command with integrity protection to the UE.

In another embodiment, user equipment (UE) includes a wireless interface configured to connect to a first access network and a second access network, and a processing circuit configured to transmit a service request for a voice call to the first access network. The processing circuit is further configured to receive a connection release message from the first access network, wherein a payload of the connection release message includes a cell redirection command with integrity protection and perform authentication of the cell redirection command in the payload of the connection release message.

In still another embodiment, a control node includes a network interface configured to communicate signaling messages with user equipment (UE) in a first access network and a processing device configured to receive an initial connection message from the UE in the first access network, wherein the initial connection message includes a service request for a voice call. The processing device is further configured to perform an authentication procedure with the UE and generate an integrity key; process the service request from the UE and generate a cell redirection command with integrity protection using the integrity key. The control node is configured to then transmit the cell redirection command with integrity protection to the UE.

In one or more embodiments above, the cell redirection command includes a NAS signaling message with a CS fallback command included in a payload of the NAS signaling message. Integrity protection of the payload of the NAS signaling message is performed using the integrity key.

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof.

Figure 1:
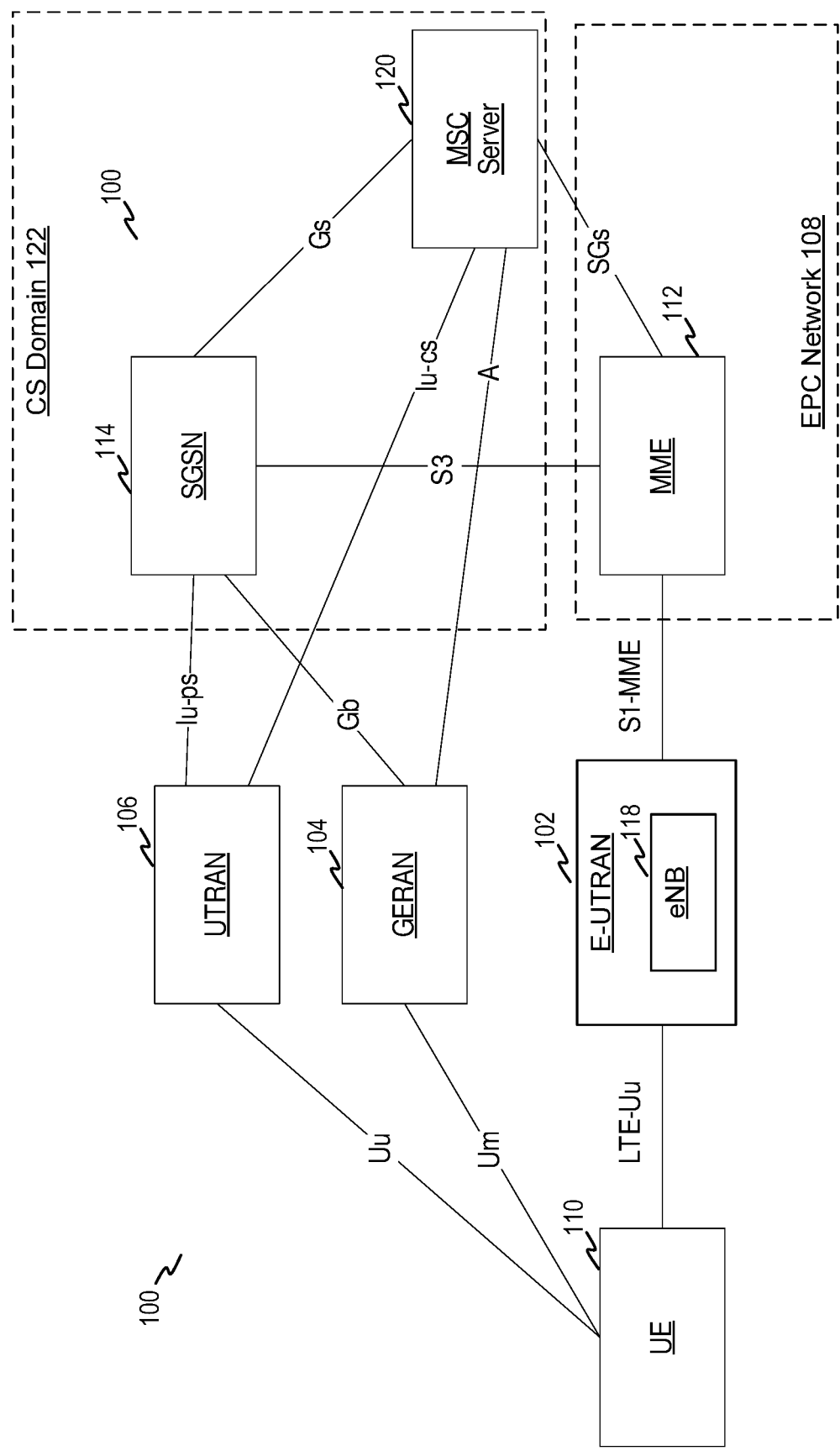
FIG. 1 illustrates a schematic block diagram of an embodiment of a network for cell redirection.

Some of the abbreviations used herein are expanded below for convenience:
AKA Authentication and Key Agreement
CS Circuit-Switched
GERAN GSM/EDGE Radio Access Network
HSS Home Subscriber Server
EPC Evolved Packet Core
ePDG Evolved Packet Data Gateway
EAP Extensible Authentication Protocol
E-UTRAN Evolved Universal Terrestrial Radio Access Network
GPRS General Packet Radio Service
GSM Global System for Mobile communication
MME Mobility Management Entity
MSC Mobile Switching Center
NAS Non Access Stratum
RRC Radio Resource Control
SGSN Serving GPRS Support Node
UE User Equipment
UTRAN Universal Terrestrial Radio Access Network FIG. 1 illustrates a schematic block diagram of an embodiment of a network 100 for cell redirection. This exemplary network 100 is described in more detail in the technical standard TS 23.272 V. 13.4.0 (June 2016) entitled, "3rd Generation Partnership Project; Technical Specification Group Services and System Aspects; Circuit Switched (CS) fallback in Evolved Packet System (EPS); Stage 2 (Release 13)," which is hereby incorporated by reference herein. Though this network 100 is described herein, other networks and architectures may also be implemented in one or more embodiments described herein.

User Equipment (UE) 110 includes an interface configured to access a CS domain 122 (such as a GSM or UMTS network) over a GERAN access network 104 and/or a UTRAN access network 106. The GERAN access network 104 includes GSM radio access technology, including its evolutions in the form of Enhanced Data rates for Global Evolution (EDGE) and/or the General Packet Radio Service (GPRS). The UTRAN access network 106 is the UMTS radio access network that may connect traffic from a circuit switched to IP based packet switched core networks.

The UE 110 interface is also configured to support communication with an E-UTRAN access network 102 over an LTE user air interface (LTE-Uu). The E-UTRAN access network 102 includes one or more eNodeB or eNBs 118 for connection of the UE 110 to a Mobility Management Entity (MME) 112 in an evolved packet core (EPC) network 108. The MME 112 provides support for the control plane in the EPC network 108. The MME 112 provides signaling related to mobility and security for access to the EPC network 108 through the E-UTRAN 102 by the UE 110. The MME 112 is also configured for tracking and paging of the UE 110 in idle-mode. The MME 112 uses Non-Access Stratum (NAS) set of protocols for control plane signaling with the UE 110 for EPC network access. The Radio Resource Control (RRC) protocol is used in UMTS and LTE on the air interface between the UE 102 and the E-UTRAN 102.

The Serving GPRS Support Node (SGSN) 114 is configured for processing of packet switched data within the network 100, e.g. the mobility management and authentication of the UE 110. The MSC server 120 is a GSM node configured to control switching in the CS domain 122. The SGs interface, e.g. as defined in 3GPP TS 29.118 (SGsAP), may be used between the MME 112 and the MSC Server 120 in support of cell redirection or CS fallback as described herein.

Figure 2:
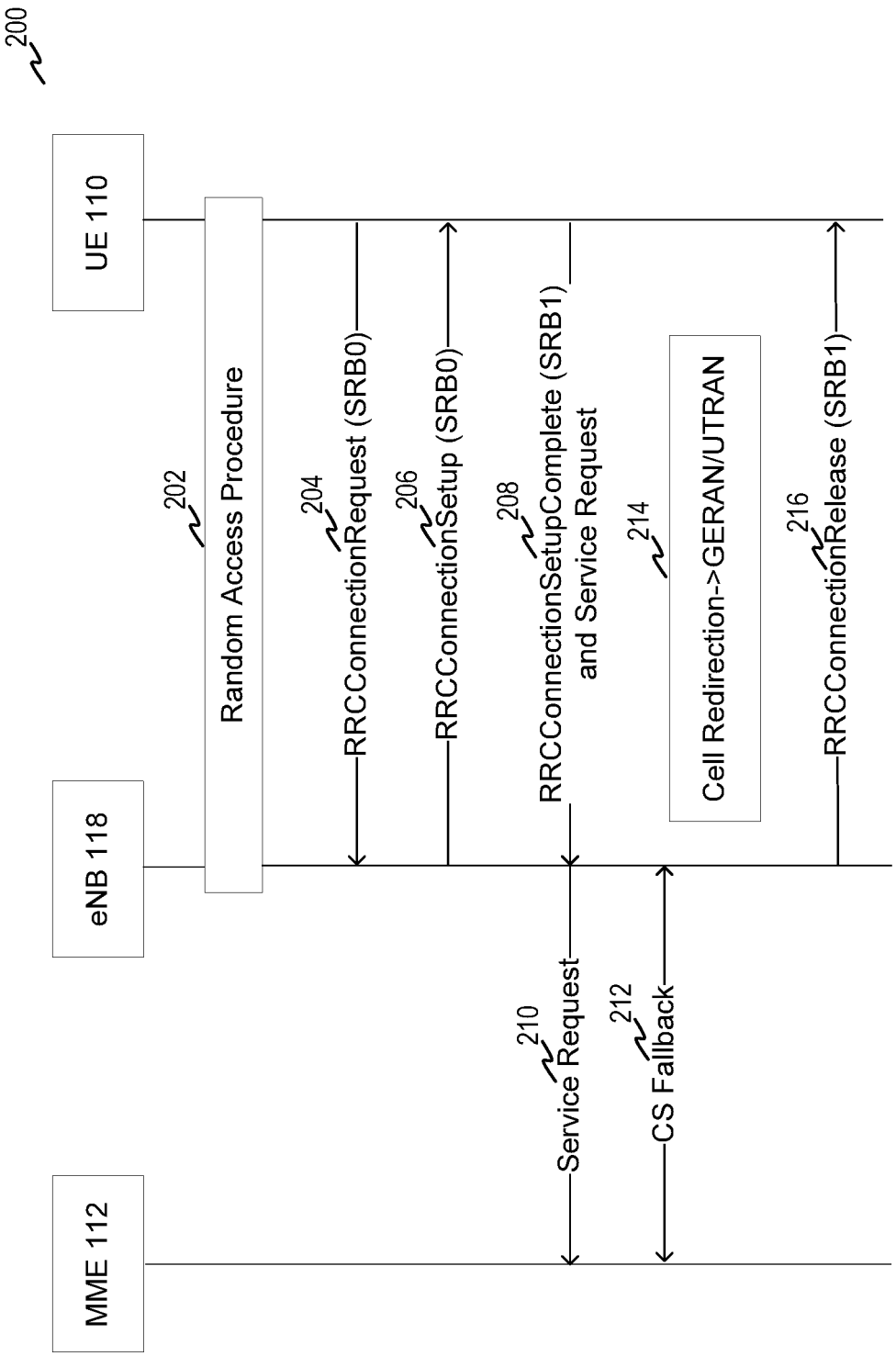
FIG. 2 illustrates a logical flow diagram of an embodiment of a method for cell redirection.

FIG. 2 illustrates a logical flow diagram of an embodiment of a method 200 for cell redirection. Call Redirection or Circuit switched (CS) Fallback as described herein enables a UE 110 that is accessing an E-UTRAN 102 in a 3GPP/LTE network to access a GERAN 104 or UTRAN 106 in a CS domain 122 during a call setup process. The reuse of voice services from the CS domain 122 has been standardized to facilitate first deployments option for LTE networks or other packet switched networks. Current procedures are described in standardized protocols, e.g., 3GPP TS 36.331 v. 14.1.0 (dated December 2016) and entitled, "3rd Generation Partnership Project; Technical Specification Group Radio Access Network; Evolved Universal Terrestrial Radio Access (E-UTRA); Radio Resource Control (RRC); Protocol specification (Release 14)," which is hereby incorporated by reference herein.

As an example, RRC Connection Release with redirection to GERAN/UTRAN may be performed according to the following message flow shown in FIG. 2. The UE 110 and eNB 118 perform a random access procedure 202 for the UE 110 to synchronize with the E-UTRAN 102. After the random access procedure 202, if the UE 110 is not already attached to the EPC network 108, the UE 110 initiates an attach procedure.

In the attach procedure, the UE 110 initiates an RRC connection using a three way RRC handshake procedure with the eNB 118 and MME 112. The UE 110 transmits an RRC Connection Request (SRB0) 204 to the eNB 118 which responds with an RRC Connection Setup (SRB0) message 206. The UE 110 then transmits an RRC Connection Setup Complete (SRB1) message 208 to the eNB 118 that includes a Service Request. The service request may be formatted in accordance with, for example, a Non Access Stratum (NAS) message. NAS messages may be used as signaling between the UE 110 and the MME 112. The service request 210 is forwarded to the MME 112 for processing.

When the service request 210 includes a request for a voice service, the MME 112 may initiate a cell redirection procedure. The MME 112 transmits a CS Fallback message 212 to the eNB 118 that indicates to the eNB 118 that the UE 110 should be redirected to connect through another access network, such as a UTRAN network 106 or GERAN network 104. The MME 112 may also initiate a cell redirection procedure if there is a pending voice call to be terminated to the UE 110. The eNB 118 then triggers a cell redirection process 214 to redirect the UE 110 to another access network (UTRAN/GERAN). The eNB 118 may also transmit an RRC Connection Release message 216 to release the RRC connection for the UE 110. The RRC connection release message 216 may be sent over a signaling channel, such as the LTE SRB1 signaling channel.

A potential attack during this Cell Redirection 214 may occur in two instances. In the first instance, the UE 110 performs an initial attach to a network and makes a service request for a voice call origination by the UE. In the second instance, the UE 110 is in an idle mode and initiates a service request for a pending voice call to be terminated on the UE, in response to paging messages by the network. To protect against such potential attacks, one or more embodiments of the following exemplary security procedures may be implemented.

When the UE 110 initiates an "Initial Attach" procedure to the E_UTRAN 102 with a service request for a voice call, the UE 110 is not yet authenticated by the EPC network 108. In turn, the UE 110 may not have authenticated the EPC network 108. Thus, in an embodiment, the EPC network 108 processes the Initial Attach procedure and authenticates the UE 110 prior to processing the service request for the voice call.

For example, when an RRC Connection message from the UE 110 includes an "Initial Attach" indicator with a "Service Request (Voice Call)", the MME 112 first processes the Initial Attach request from the UE 110 prior to processing the Service Request. The UE 110 must then first pass authentication as part of the "Initial Attach" procedure. This authentication verifies to both the UE 110 and the MME 112 that the other is genuine. The "Initial Attach" procedure is described in various standards including, e.g., 3GPP TS 23.401 "General Packet Radio Service (GPRS) enhancements for Evolved Universal Terrestrial Radio Access Network (E-UTRAN) access," Release 14 dated June 2016, which is hereby incorporated by reference herein.

In particular, an Authentication and Key Agreement (AKA) procedure between an MME and UE is specified in 3GPP TS 33.401 "3GPP System Architecture Evolution: Security Architecture," Release 14, Sep. 30, 2016, which is hereby incorporated by reference herein. The AKA procedure describes protocols for mutual authentication of the UE 110 and the MME 112. The successful completion of the AKA procedure results in the establishment of a security association (i.e., set of security data) between the UE 110 and the MME 112 that enables a set of security services. For example, the security data established during the AKA procedure may include integrity keys for securing communications using symmetric cryptography between the UE 110 and the MME 112.

One possible threat during cell redirection is a "fake" GERAN 104. For example, the UE 110 receives a cell redirection message with a fake GERAN 104 identity. In one embodiment, to address this threat of redirection to a fake GERAN 104, the MME 112 only processes the "Service Request (Voice Call)" from the UE 110 after completion of an AKA procedure and setup of integrity keys with the UE 110.

Figure 3:
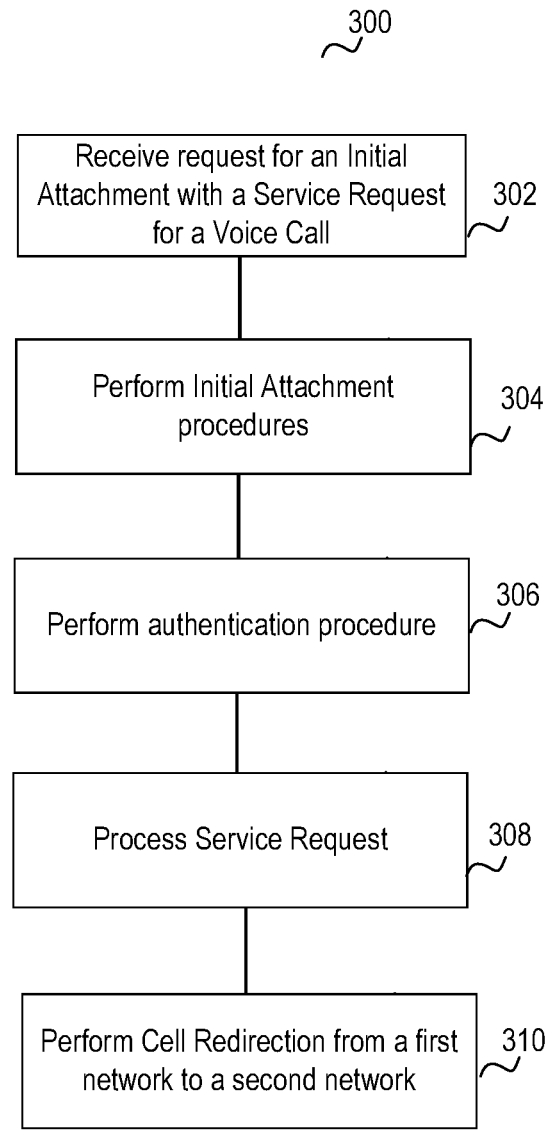
FIG. 3 illustrates a logical flow diagram of an embodiment of a method for cell redirection with security procedures.

FIG. 3 illustrates a logical flow diagram of an embodiment of a method 300 for cell redirection with security procedures. The UE 110 transmits a connection request for an initial attachment to the E_UTRAN 102 with a service request for a voice call in step 302. Prior to processing the service request, the MME 112 first performs initial attachment procedures in step 304. During the Initial Attach procedure, the Mobile Equipment (ME) Identity is obtained from the UE 110. The MME 112 may then verify the ME Identity.

In addition, as part of the initial attachment procedure or otherwise, an authentication procedure is performed between the UE 110 and the E_UTRAN 102 in step 306. For example, an AKA procedure or other type of authentication procedure is performed that authenticates the UE 110 to the MME 112 and/or the MME 112 to the UE 110. The service request is then processed in step 308. After completion of the authentication procedure, the MME 112 then initiates cell redirection of the UE 110 from a first network (e.g., the E-UTRAN 102) to a second network (such as the UTRAN 106 or GERAN 104). The second network may then complete the service request for a voice call in step 310.

Figure 4:
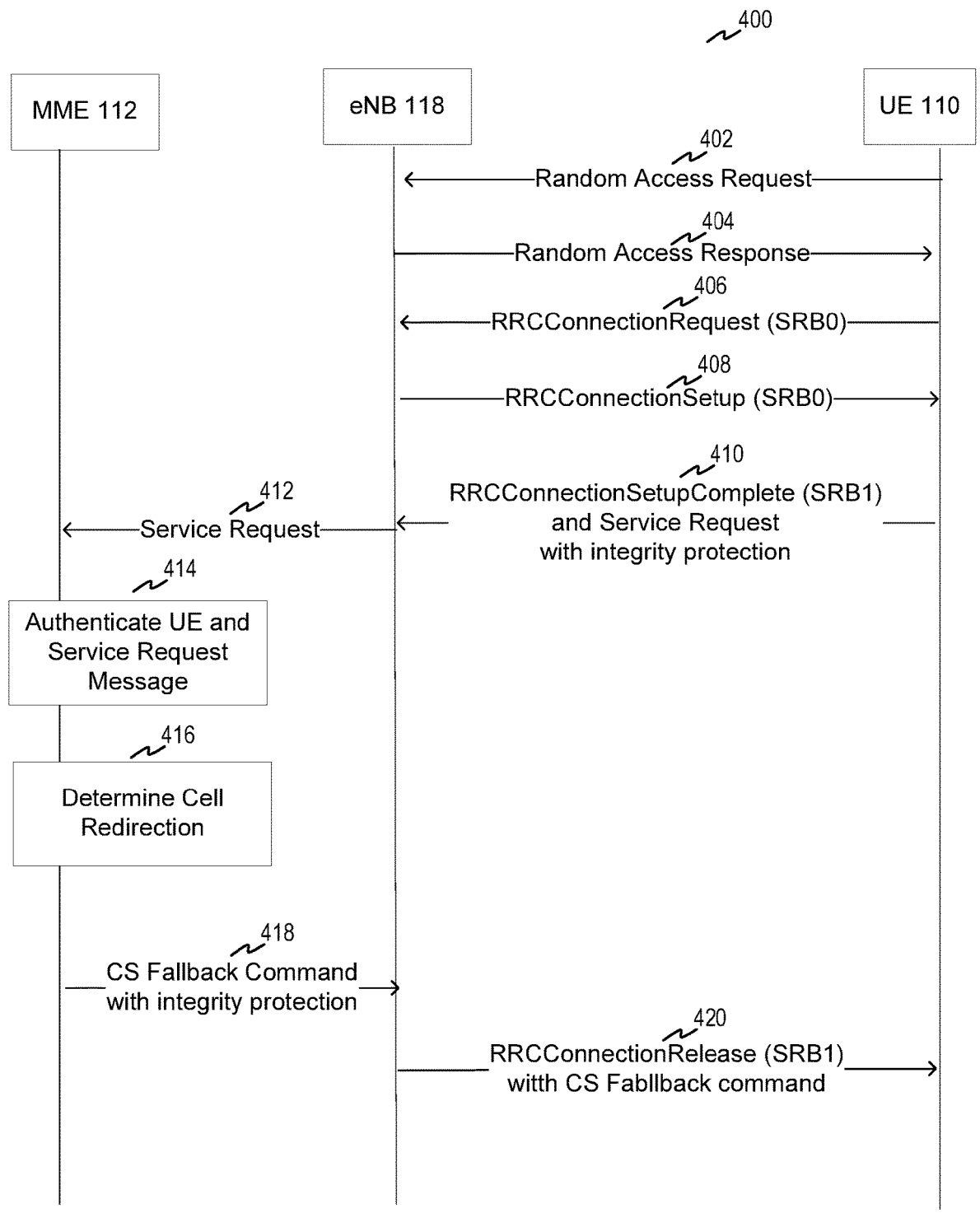
FIG. 4 illustrates a logical flow diagram of an embodiment of another method for cell redirection with security procedures.

FIG. 4 illustrates a logical flow diagram of an embodiment of another method 400 for cell redirection with security procedures. In this instance, the UE 110 is in an idle mode. For example, the UE 110 may be in an RRC_IDLE state in which the UE 110 is powered on but does not have an established connection (such as an RRC connection) with an access network. The location of the UE 110 without an established connection is, in general, not known to the network at the cell level. The eNB 118 does not have any context for the UE 110.

When in an idle mode, the UE 110 must first request an RRC connection. The UE 110 generates and transmits a random access channel request at 402. The eNB 118 responds with a random access channel response/grant at 404. The UE 110 then generates and transmits an RRC Connection Request at 406, e.g. over a signaling channel. The signaling channel may include an LTE signaling radio bearer (SRB) channel, such as SRB0. The eNB 118 acknowledges with an RRC Connection Setup over the SRB0 channel at 408. The UE is transited to ECM-CONNECTED mode, e.g., as specified in more detail in 3GPP TS 23.401 "General Packet Radio Service (GPRS) enhancements for Evolved Universal Terrestrial Radio Access Network (E-UTRAN) access," Release 14 dated June 2016, which is hereby incorporated by reference herein.

The UE 110 generates and transmits an RRC Connection setup complete 410 and service request over a signaling channel, e.g. such as the LTE SRB1 channel. In an embodiment, the service request includes an indication that the UE 110 is requesting a voice call. The service request may be included in a Non Access Stratum (NAS) message format. The UE 110 protects an integrity of the NAS service request to the MME 118 using the integrity keys established during the authentication procedure (such as the AKA procedure) performed during the RRC connection setup. For example, an NASint key determined using the integrity keys is used to protect the NAS payload in the NAS service request message 412.

The eNB 118 forwards the NAS service request message 412 to the MME 112. The MME 112 authenticates the UE 110 and the service request message at 414. If authenticated, the MME 112 processes the service request for the voice call.

In this example, the MME 112 determines that there is a need for Cell Redirection to a second network for the service request at 416. For example, the MME 112 determines that the voice call should be terminated to the UE 110 using a GERAN/GSM network, or the LTE network may not support the voice call for load or maintenance or other network conditions. The MME 112 may also determine a need for Cell Redirection if the service request 416 included a request for voice call origination.

The MME 112 then generates and transmits a CS fallback command 418 to the UE 110 using the S1 application protocol (AP) interface (S1 AP interface). For added security, the MME 112 includes integrity protection of the CS fallback command to the UE 110. In a first embodiment, the CS fallback command 418 may include an NAS command with integrity protection using the NASint key established during the AKA procedure. The MME 112 generates the NAS command with the CS fallback command to the UE 110 in the payload. The NASint key protects the payload of the NAS command 418. The CS fallback command may thus include an NAS payload addressed to the UE that is protected with the NASint key. In current procedures, this CS fallback command or message fails to include an NAS payload or integrity protection of the payload.

In a second embodiment, the integrity protection includes inserting a NAS Token using the NASint key of the UE 110 in the CS fallback command protection. The MME 112 generates the NAS Token using the NASint key of the UE 110. The MME 112 includes the NAS Token in the CS fallback command to the UE 110. Thus, instead of integrity protection of the NAS payload, the MME 112 includes the NAS Token in the CS fallback command Due to space limitations in the RRC redirect message, this second embodiment reduces the bytes used in the CS fallback command message for integrity protection. The UE 110 may then authenticate the CS Fallback command using the NAS Token and its NASint key.

The eNB 118 transmits an RRC Connection Release message 420 to the UE 110 that includes the CS fallback command. The CS fallback command may also include parameters of a second network or cell for attachment, such as identification parameters of a GERAN 104 or UTRAN 106. The eNB 118 transparently includes the NAS payload or the NAS Token received over the S1 AP interface from the MME 112. Since the UE 110 and the eNB 118 do not share a security context, the RRC Connection Release message is not integrity protected. However for integrity protection, the NAS payload included within the RRC Connection Release message 420 is integrity protected by the MME 112 or an NAS Token generated by the MME using UE's NAS context is included in the CS fallback command. The UE may verify the NAS payload using the NASint key or the NAS Token to verify that the CS fallback command originated from the MME 112 and not from a "fake" MME.

Figure 5:
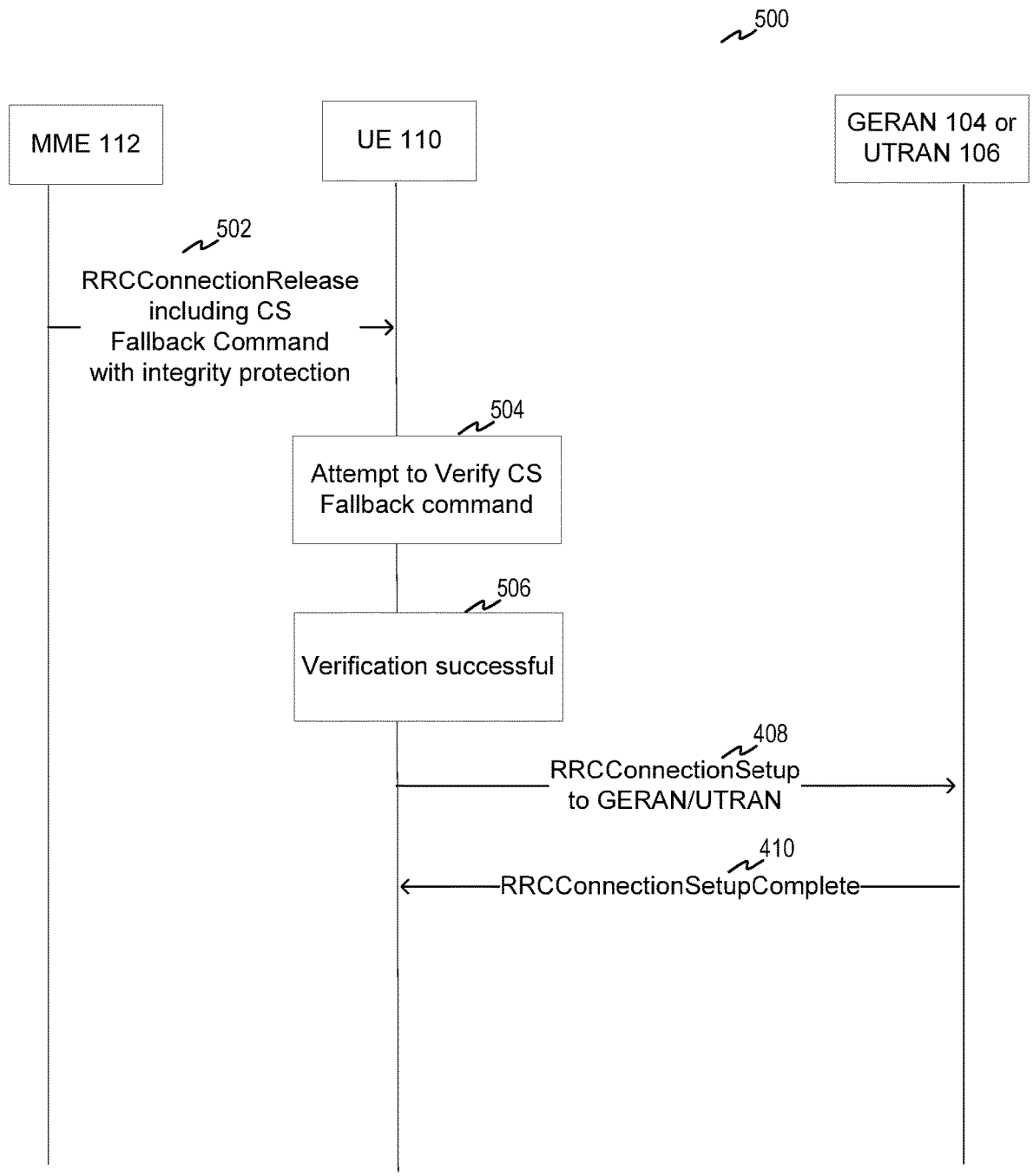
FIG. 5 illustrates a logical flow diagram of an embodiment of a method for cell redirection with security procedures with a successful verification.

FIG. 5 illustrates a logical flow diagram of an embodiment of a method 500 for cell redirection with security procedures with a successful verification. The UE 110 receives the RRC Connection release message 502 including the CS Fallback Command with integrity protection. The message may also include identification parameters of another network for attachment, e.g. a GERAN 104 or UTRAN 106.

The UE 110 attempts to verify the CS fallback command at 504. For example, the CS Fallback command may be part of a payload of an NAS message encoded with an NASint key. The UE 110 attempts to verify the NAS payload of the NAS message using the NASint key. In another example, the CS fallback command includes an NAS Token generated using the NASint key of the UE 110. The UE 110 attempts to verify the NAS Token using its NASint key.

When the verification is successful at 506, e.g., the NAS payload or the NAS Token passes the integrity check or authentication, the UE 110 processes the RRC Connection Release command and attempts to connect to another network. For example, the UE 110 may transmit an RRC Connection Setup message 408 to the GERAN 104 or UTRAN 106 identified in the CS fallback command. The GERAN 104 or UTRAN 106 may then transmit an RRC Connection Setup Complete message 410 to the UE 110 to establish an RRC connection to provide a voice call to the UE 110.

Figure 6:
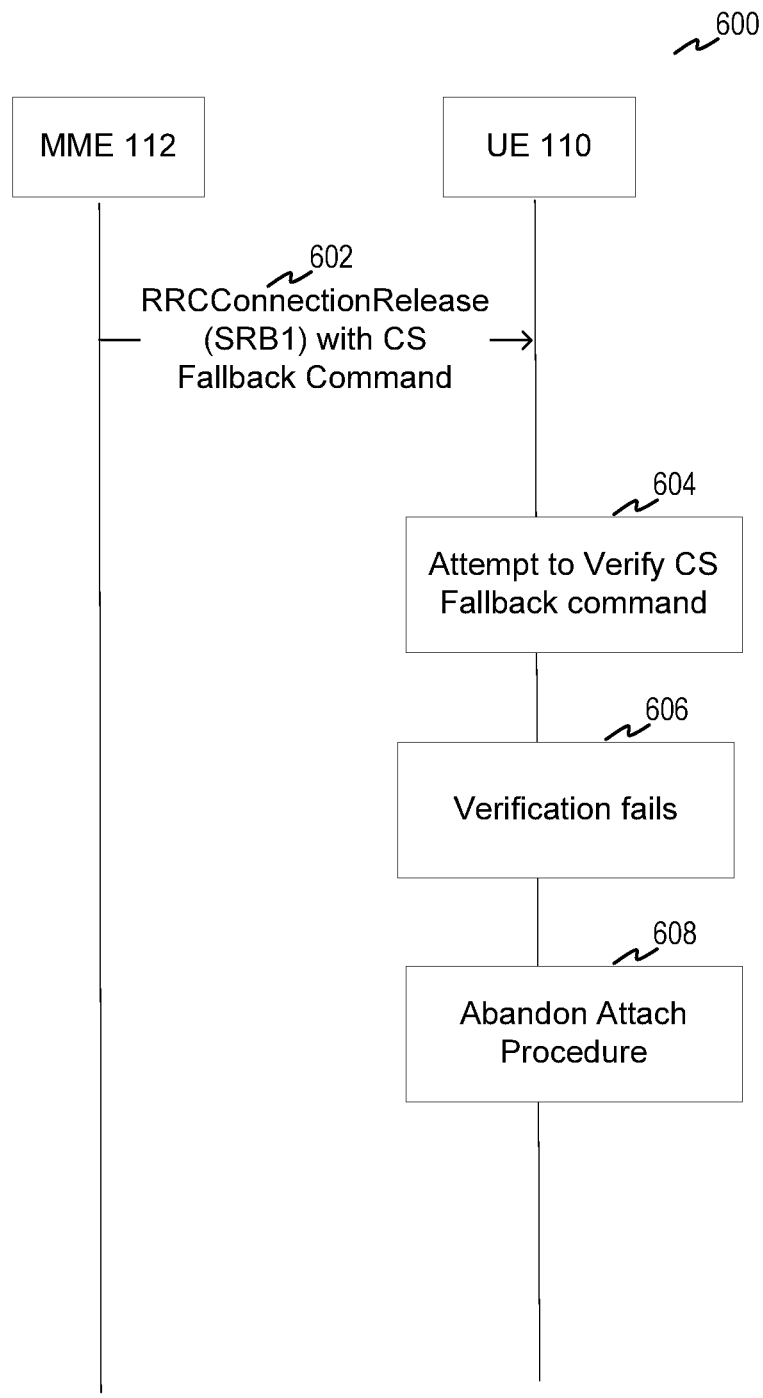
FIG. 6 illustrates a logical flow diagram of an embodiment of a method for cell redirection with security procedures with a failed verification.

FIG. 6 illustrates a logical flow diagram of an embodiment of a method 600 for cell redirection with security procedures with a failed verification. The UE 110 receives the RRC Connection release message 602 including the CS fallback Command with integrity protection. The UE 110 attempts to verify the CS fallback command at 604. For example, the CS fallback command may be part of a payload of an NAS message encoded with an NASint key (e.g. an integrity key). The UE 110 attempts to verify the NAS payload or the NAS Token of the NAS message using the NASint key (e.g. an integrity key).

In an embodiment, the verification fails at 606. The verification may fail, for example, because the UE 110 is unable to authenticate the NAS payload or the NAS Token. The NAS payload or the NAS Token fails to pass the integrity check or authentication or the RRC Connection Release message does not include a NAS payload. When the verification fails at 606, the UE 110 abandons or discards the attach procedure at 608.

Figure 7:
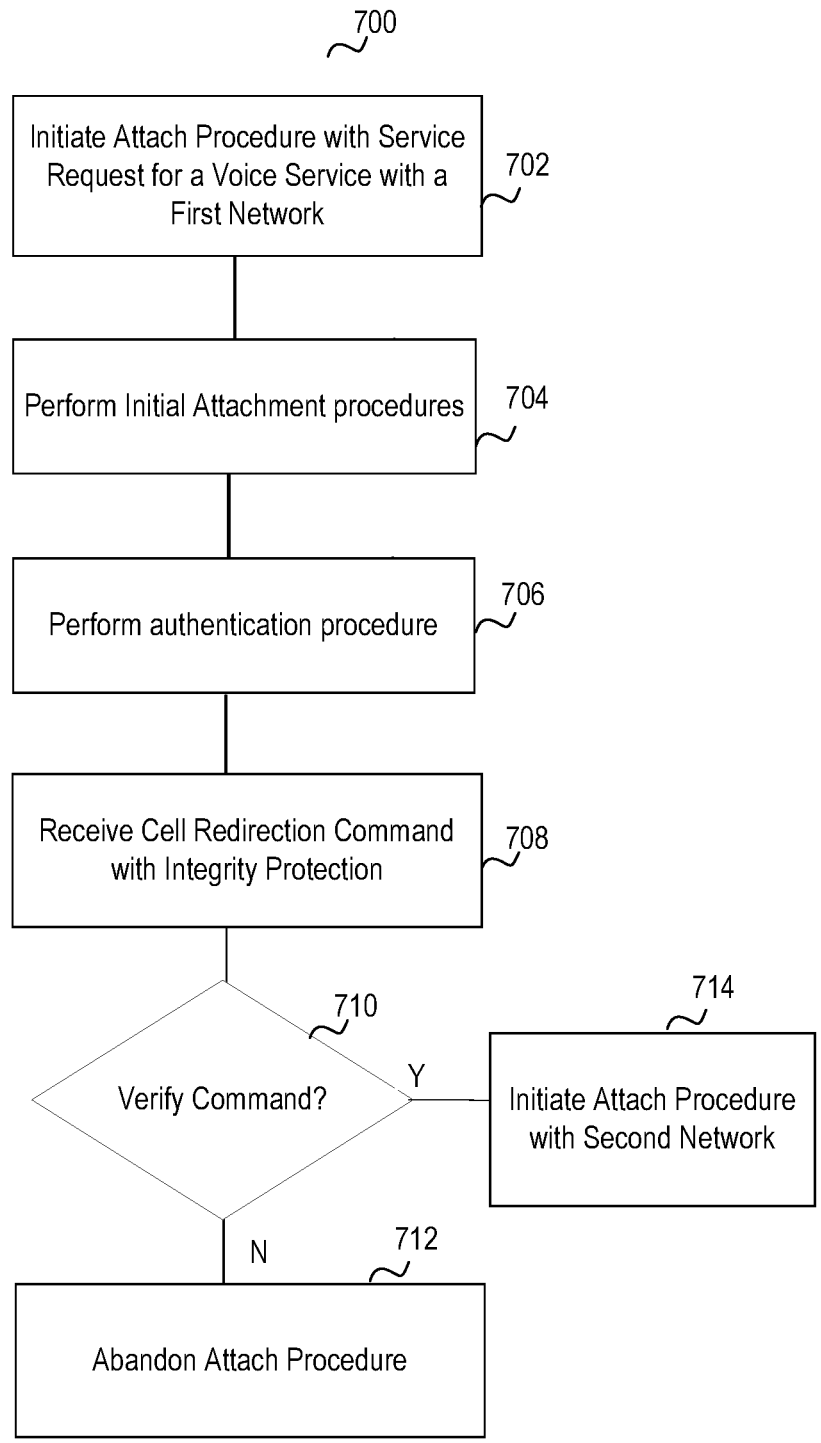
FIG. 7 illustrates a logical flow diagram of an embodiment of a method for cell redirection with security procedures.

FIG. 7 illustrates a logical flow diagram of an embodiment of a method 700 for cell redirection with security procedures. The UE 110 is in an idle mode and initiates an attach procedure with a service request for a voice service with a first network at 702. The first network may include a E-UTRAN 102 with access to an EPC Network 108 (such as an LTE or other packet switched type network). Prior to processing the service request, the UE 110 performs an initial attachment procedure with the first network to establish a connection with the first network at 704. The UE 110 and the first network perform an authentication procedure at 706 to exchange authentication information, such as encryption keys. For example, an AKA procedure or other type of authentication procedure is performed that authenticates the UE 110 to the first network and the first network to the UE 110.

After the authentication procedure at 706, the UE 110 receives a cell redirection command with integrity protection at 708. The cell redirection command may include, e.g., a CS fallback message in a payload of an NAS message. The integrity protection allows the UE 110 to verify the source of the message as the first network and/or verify the cell redirection command.

When the UE 110 verifies the command and/or the source of the command as the first network at 710, the UE initiates connection with a second network to provide the voice service at 714. The second network may include a circuit switched network or domain 122 with an access network such as the UTRAN 106 or GERAN 104. The second network may then complete the service request for the voice call. When the UE 110 fails to verify the command and/or the source of the command as the first network at 710, the UE 110 ignores the CS fallback command and abandons or discards the attach procedure with the second network at 712.

Figure 8:
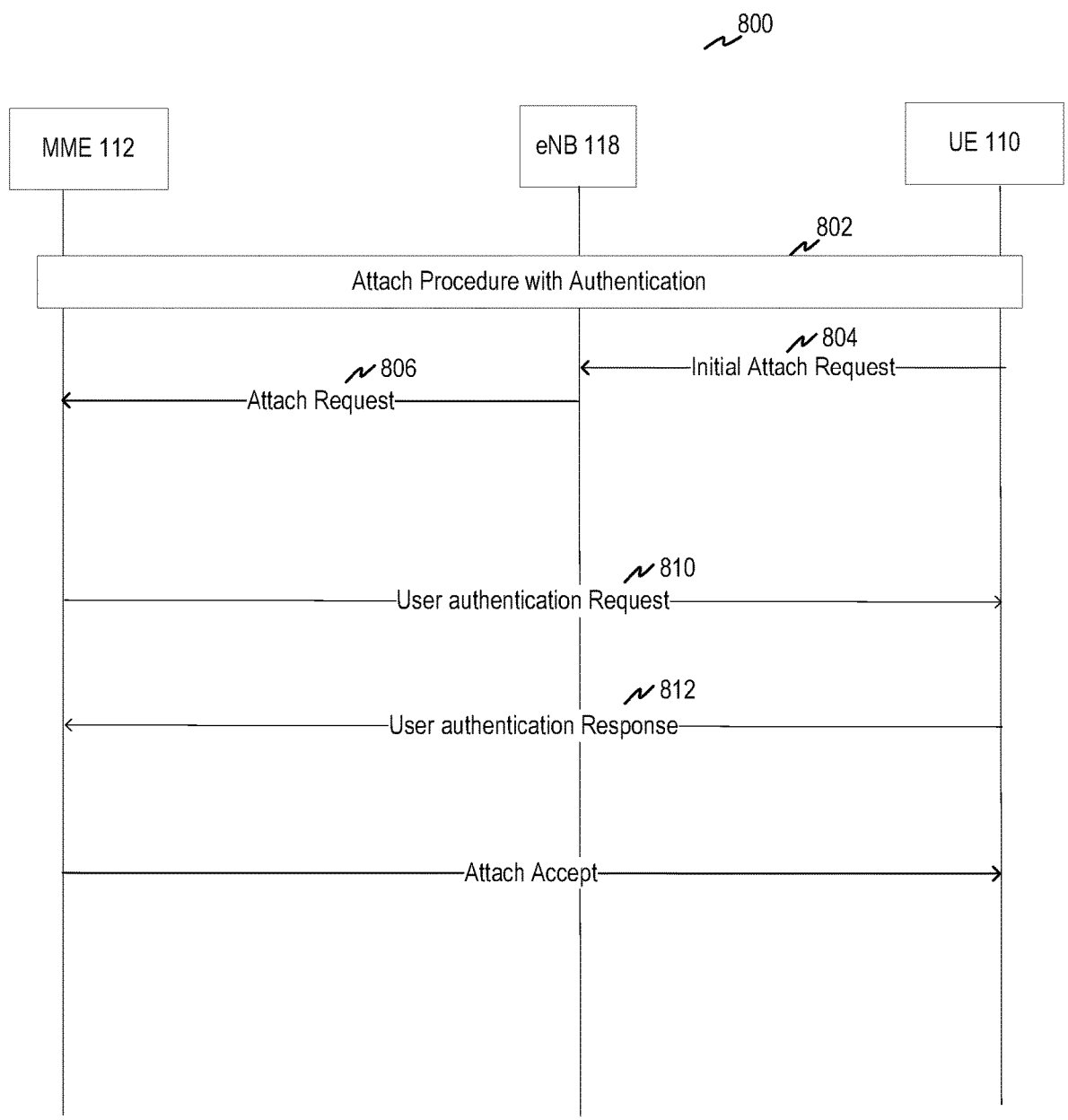
FIG. 8 illustrates a logical flow diagram of performing an authentication procedure in more detail.

FIG. 8 illustrates a logical flow diagram of a method 800 for performing an authentication procedure in more detail. When the UE 110 is in an idle mode, the UE 110 and must first attach to the E-UTRAN 102 by performing an attach procedure. In an embodiment herein, the attach procedure includes an authentication procedure at 802.

The UE 110 transmits an initial attach request 804 to the eNB 118 at 804 which forwards the initial attach request to the MME 112 at 806. When the UE 110 supports CS fallback, the UE 110 may include an information element, "Voice domain preference and UE's usage setting" in the Attach Request.

In this embodiment, the UE 110 and MME 112 perform authentication prior to a service request for a voice call that includes cell redirection. The authentication may include one or more types of integrity protection procedures. For example, one integrity protection procedure includes the AKA procedure that produces security data such as integrity keying material for RRC and NAS ciphering keys as well as RRC and NAS integrity protection. The MME 112 transmits a user authentication request to the UE 110 at 810. The user authentication request may include a random challenge RAND and an authentication token AUTN for network authentication from an authentication vector. The authentication request may also include a base key $K_{ASME}$. The UE and MME share the base key $K_{ASME}$.

At receipt of this message, the USIM of the UE verifies the authentication vector by checking whether AUTN can be accepted. If so, the USIM computes a response RES. USIM computes keys CK, IK from a permanent key K stored on the USIM on a UICC and in the home location register (HLR) in the EPC network 108. The keys CK, IK are the pair of keys derived in the HLR and on the USIM of the UE 110 during the AKA procedure. The UE 110 transmits a user authentication response at 812 that includes the response RES computed from the keys CK, IK.

The MME checks that the RES. If verified, the authentication is successful. If not, depending on the type of identity used by the UE 110, the MME 112 may initiate further identity requests or send an authentication reject message towards the UE 110. After the authentication procedure is successful, the MME 112 transmits an attach accept message to the UE 110.

Figure 9:
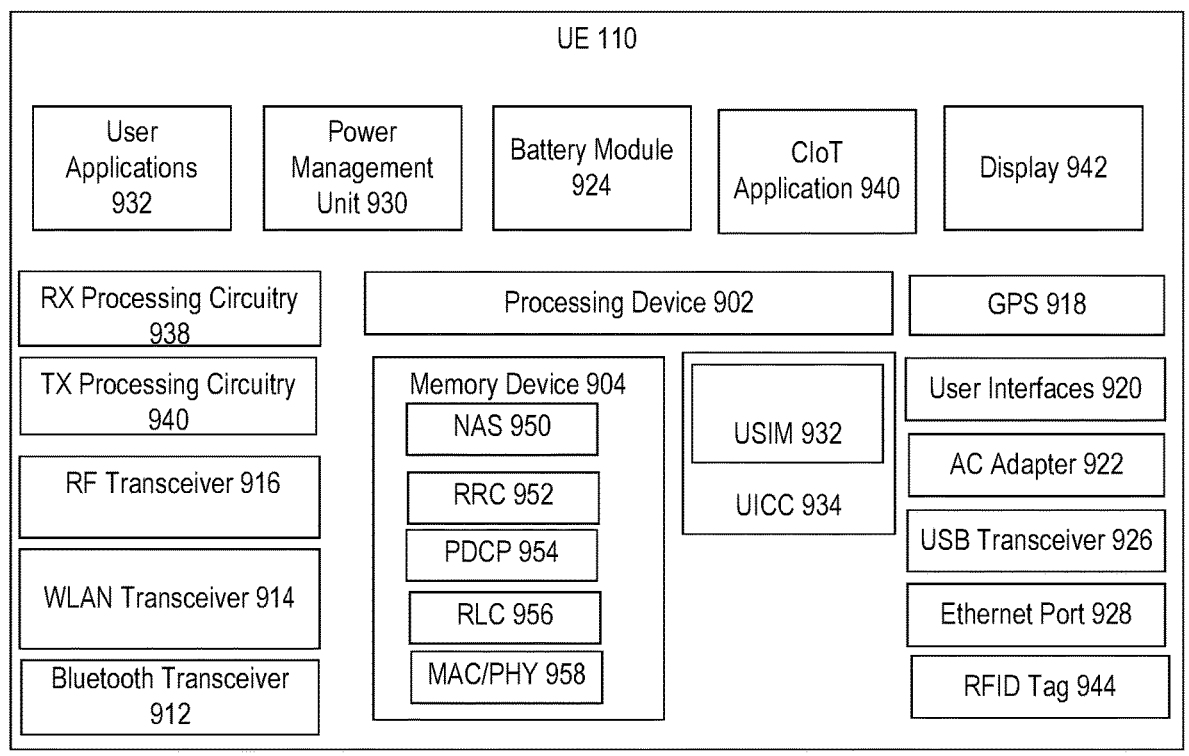
FIG. 9 illustrates a schematic block diagram of an embodiment of example user equipment.

FIG. 9 illustrates a schematic block diagram of an embodiment of example user equipment 110. The user equipment (UE) 110 may include a smart phone, smart tablet, laptop, smart watch, PC, TV or other device. The UE 110 described herein is for illustrative purposes only. Additional or alternative components and functions may be included within the UE 110 or combined with other components or functions. In addition, one or more of the functions and components shown herein may not be present within the UE 110.

The UE 110 includes a processing device 902 and a memory device 904 that stores operational instructions that when performed by the processing device 902 may perform one or more of the functions described herein with respect to the UE 110. For example, the memory device 904 may include instructions and data that when used by the processing device 902 processes functions of various protocols and procedures, e.g. such as in a protocol stack including the NAS 950, Radio Resource Control (RRC) 952, Packet Data Convergence Control (PDCP) 954, Radio Link Control (RLC) 956 and Medium Access Control and physical layer functions 958. In addition, the UE 110 may also include a UICC 934 that includes a USIM 932.

The UE 110 may further include a Bluetooth transceiver 912, a WLAN (IEEE 802.11x compliant) transceiver 914, and global positioning satellite (GPS) transceiver 918. The WLAN transceiver 914 may operate as a non-3GPP access interface to the EPC network 108. The UE 110 also includes an RF transceiver 916 compliant with Universal Mobile Telecommunications System (UMTS) Terrestrial Radio Access Network (UTRAN), Long Term Evolution (LTE) Evolved UTRAN (E-UTRAN), LTE-Advanced (LTE-A) or other wireless network protocols. The UE 110 includes RX processing circuitry 938 and TX processing circuitry 940.

The UE 110 may further include user applications 932, AC adapter 922, USB transceiver 926 and Ethernet Port 928. The UE 110 may further include one or more user interfaces 920, such as a touch screen controller, speaker, microphone or display 942. The UE 110 may also include a power management unit 930 and battery module 924. One or more internal communication buses (not shown) may communicatively couple one or more of the components of the UE 110.

Figure 10:
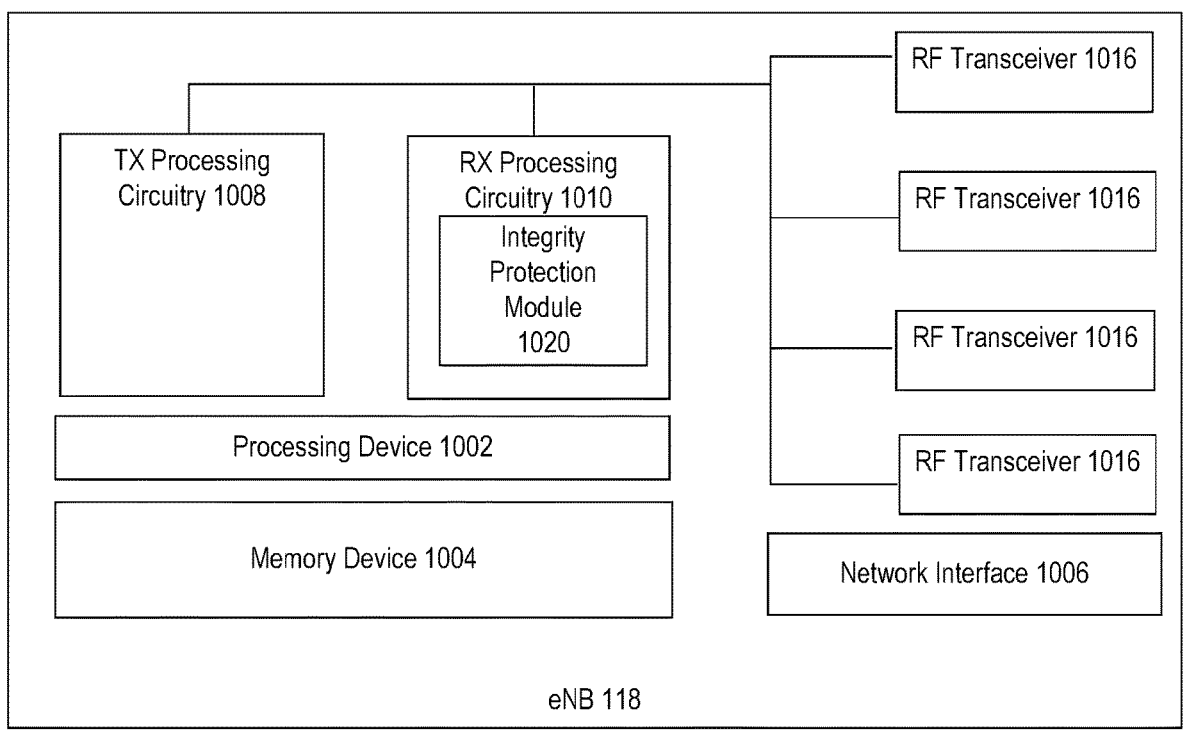
FIG. 10 illustrates a schematic block diagram of an embodiment of an exemplary eNodeB.

FIG. 10 illustrates a schematic block diagram of an embodiment of an exemplary eNB 118. The eNB 118 described herein is for illustrative purposes only. One or more of the functions or components shown herein may not be present or may be combined with other components or functions. Additional components or functions may also be included. The eNB 118 includes a processing device 1002 and a memory device 1004 that stores instructions that when performed by the processing device 1002 may perform one or more of the functions described herein with respect to the eNB 118.

The eNB 118 includes multiple RF transceivers 1016, transmit (TX) processing circuitry 1008, and receive (RX) processing circuitry 1010. The eNB 118 also includes a network interface 1006 for communicating with other eNBs 118 and core network nodes (such as the MME 118).

The RF transceivers 1016 receive incoming RF signals, such as signals transmitted by UEs 110. The RF transceivers 1016 down-convert the incoming RF signals to generate IF or baseband signals. The IF or baseband signals are sent to the RX processing circuitry 1012, which generates processed baseband signals by filtering, decoding, and/or digitizing the baseband or IF signals. The RX processing circuitry 1010 transmits the processed baseband signals to the processing device 1002 for further processing. The RX processing circuitry 1010 includes an integrity protection module 1020 that is configured to perform one or more functions described herein with respect to the PDCP integrity protection.

The TX processing circuitry 1008 receives analog or digital data from the processing device 1002. The TX processing circuitry 1008 encodes, multiplexes, and/or digitizes the outgoing baseband data to generate processed baseband or IF signals. The RF transceivers 1016 receive the outgoing processed baseband or IF signals from the TX processing circuitry 1008 and up-converts the baseband or IF signals to RF signals that are transmitted via antennas.

Figure 11:
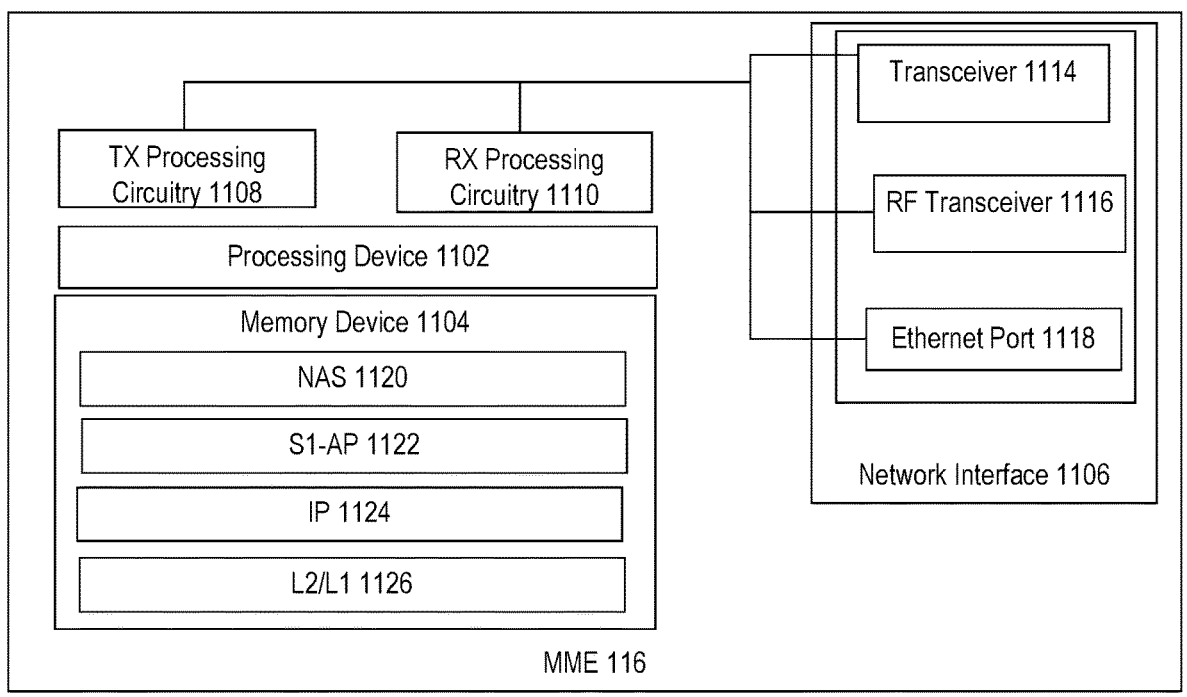
FIG. 11 illustrates a schematic block diagram of an embodiment of an exemplary MME.

FIG. 11 illustrates a schematic block diagram of an embodiment of an exemplary MME 112. MME 112 is a control node for the E-UTRAN access network 102. The MME 112 is responsible for tracking and paging procedures including retransmissions and also for idle mode of the UE 110. The MME 112 is also involved in RRC bearer activation and its deactivation procedures, and cell redirection procedures to a CS switched network or domain 122. The MME 112 is a termination point of ciphering and integrity protection for NAS signaling, including the CS fallback command or other cell redirection messages.

The MME 112 described herein is for illustrative purposes only. One or more of the functions or components shown herein may not be present or may be combined with other components or functions. Additional components or functions may also be included. The MME 112 includes a processing device 1102 and a memory device 1104 that stores instructions that when performed by the processing device 1102 may perform one or more of the functions described herein with respect to the MME 112. For example, the memory device 1104 may include instructions and data that when used by the processing device 1102 processes functions of a protocol stack, including the NAS layer 1120, S1 Application Protocol (S1AP) 1122, IP layer 1124 and Layer2/Layer1 functions 1126. The MME 112 is a termination point of ciphering and integrity protection for NAS signaling, including the CS fallback command or other cell redirection messages.

The MME 112 includes a Network Interface 1106, transmit (TX) processing circuitry 1108, and receive (RX) processing circuitry 1110. The network interface 1106 is configured for communicating with one or more eNBs 118 and other core network nodes. The network interface 1106 may include one or more types of transceivers 1114, including an RF transceiver 1116, or one or more types of ports, such as Ethernet port 1118.

Figure 12:
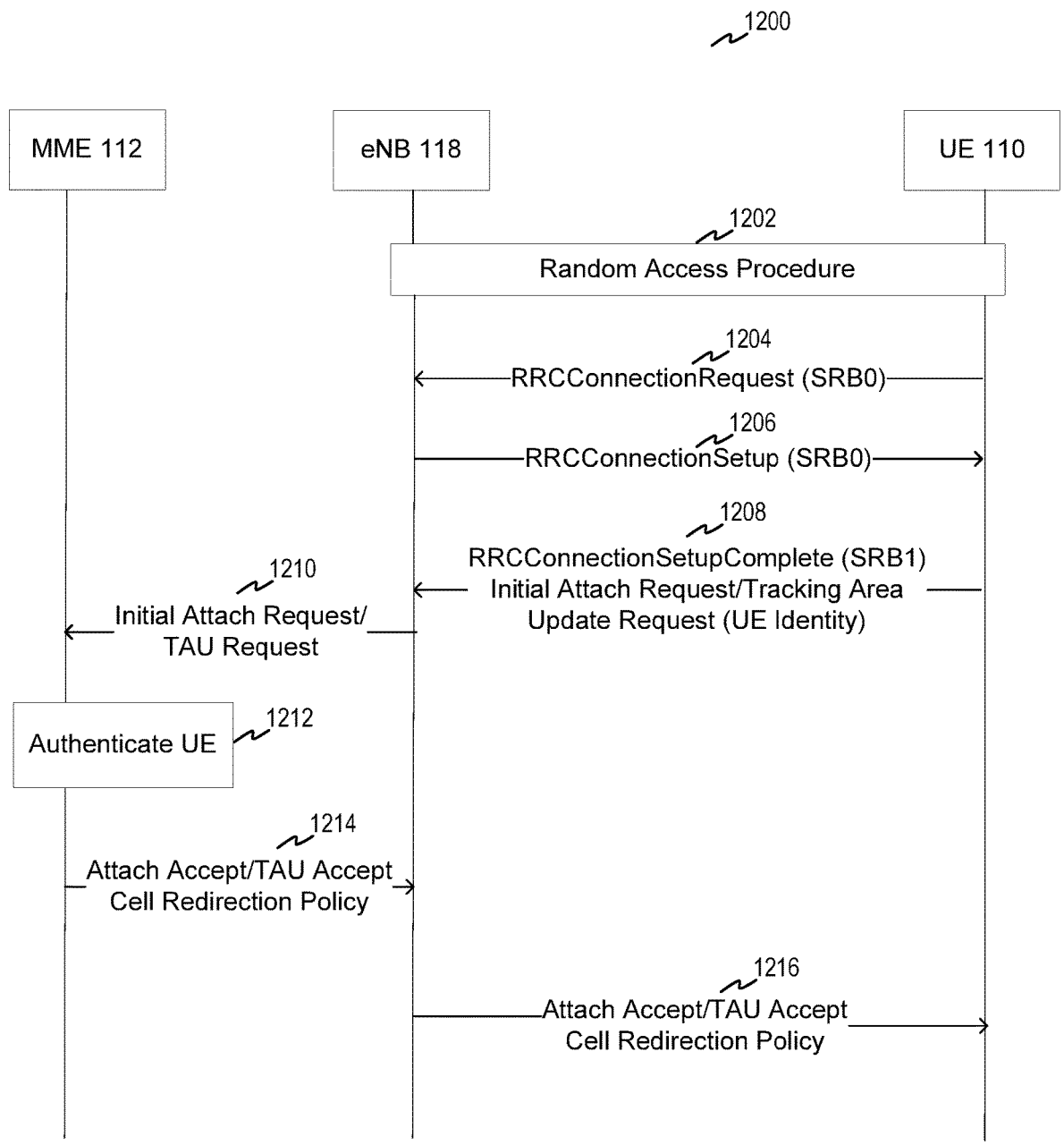
FIG. 12 illustrates a logical flow diagram of an embodiment of a method for informing the Cell Redirection Policy to a UE.

FIG. 12 illustrates a logical flow diagram of an embodiment of a method for informing the Cell Redirection Policy to a UE. In an embodiment, the MME 112 informs a UE 110 whether cell redirection with integrity protection is supported. This process may be performed in any network, e.g., irrespective of whether the network has a 2G or 3G network overlaid with an LTE network. The UE 110 may then perform cell redirection in accordance with the cell redirection policy to avoid security threats.

The UE 110 and eNB 118 perform a random access procedure at 1202 for the UE 110 to synchronize with the E-UTRAN 102. After the random access procedure at 1202, if the UE 110 is not already attached to the EPC network 108, the UE 110 initiates an attach procedure.

In the attach procedure, the UE 110 initiates an RRC connection using a three way RRC handshake procedure with the eNB 118 and MME 112. The UE 110 transmits an RRC Connection Request (SRB0) at 1204 to the eNB 118 which responds with an RRC Connection Setup (SRB0) message at 1206. The UE 110 then transmits an RRC Connection Setup Complete (SRB1) message at 1208 to the eNB 118. The UE 110 may also transmit an initial attach request message to the eNB 118 with a UE identity included in it. The UE 110 may also send a tracking area update message also, if it is already authenticated and moved to the coverage of the particular tracking area under the MME 112 due to mobility in Idle mode.

The eNB 118 forwards the initial attach request message to the MME at 1210. The MME 112 authenticates the UE 110 using the UE identity presented at 1212. The authentication of the UE 110 may involve multiple messages between the UE 110 and MME 112 to derive authentication vectors, mutually verify the UE 110 and the network/MME 112 and establish a NAS security context, as described in 3GPP TS 33.401 "3GPP System Architecture Evolution: Security Architecture," Release 14, Sep. 30, 2016, which is hereby incorporated by reference herein.

After the UE 110 is authenticated, the MME 112 transmits an initial attach accept/tacking area update (TAU) accept message at 1214. The Initial Attach Accept message is security protected using the newly established NAS integrity keys to the eNB 118. The initial attach accept/TAU accept message further includes a cell redirection policy field or parameter. The cell redirection policy field informs the UE 110 of whether cell redirection with integrity protection is supported. For example, the cell redirection policy field or parameter may indicate YES when the network policy supports cell redirection with integrity protection or NO when the network policy fails to support cell redirection with integrity protection. The eNB 118 forwards the initial attach response/tacking area update response message to the UE 110 at 1216.

The UE 110 is thus informed of whether the network supports whether cell redirection with integrity protection. The MME 112 informs the UE 110 whether it provides a cell redirection with integrity protection. The UE 110 is thus informed of the network policy and whether the UE 110 may expect a cell redirection with integrity protection from the network during initial Attach or Tracking Area Update. The UE 110 may then perform cell redirection in accordance with the cell redirection policy to avoid security threats. For example, when the network policy supports security protected cell redirection, the UE 110 may only accept secured cell redirection commands. This method allows operators to implement the integrity protected cell redirection feature gradually across the network.

A processing device or applications processing device as described herein includes at least one processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory may be a single memory device or a plurality of memory devices. The memory device may be a read-only memory, random access memory, volatile memory, non-volatile memory, static memory, dynamic memory, flash memory, cache memory, and/or any non-transitory memory device that stores digital information. The term "module" is used in the description of one or more of the embodiments of elements herein. A module includes one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

What is claimed is:

1. A method for performing cell redirection, comprising:
    processing a Radio Resource Control (RRC) Connection message including an initial attach request indicator and a service request for a voice call origination from user equipment (UE) by a base station in a first access network, prior to authentication between the UE and a base station in the first access network;
    processing the initial attach request by a mobility management entity (MME) in a core network configured to communicate with the UE via the base station in the first access network, wherein processing the initial attach request includes performing a Non-Access Stratum (NAS) authentication procedure between the mobility management entity (MME) and the UE to generate an integrity key for securing communications between the MME and the UE;
    after processing the initial attach request, processing the service request from the UE for the voice call origination;
    generating a Non Access Stratum (NAS) signalling message including a cell redirection command, wherein the NAS signaling message includes integrity protection using the integrity key by the MME and transmitting the cell redirection command with integrity protection to the base station in the first access network;
    generating an RRC Connection Release message without integrity protection by the base station, wherein the RRC Connection Release message includes a payload including the NAS signalling message with the cell redirection command having integrity protection; and
    transmitting the RRC Connection Release message to the UE.

2. The method of claim 1, wherein performing the NAS authentication procedure comprises:
    performing an Authentication and Key Agreement (AKA) procedure, wherein the AKA procedure establishes the integrity key for integrity protection of NAS messages between the UE and the MME.

3. The method of claim 2, wherein generating the NAS signalling message including the cell redirection command comprises:
    generating the NAS signalling message with a Circuit-Switched (CS) fallback command included in a payload of the NAS signalling message;
    performing integrity protection of the payload of the NAS signalling message with the integrity key established with the UE; and
    transmitting the NAS signalling message to the UE.

4. The method of claim 2, wherein generating the NAS signalling message including the cell redirection command comprises:
    determining an NAS Token using the integrity key established with the UE; and
    inserting the NAS Token with the cell redirection command to the UE.

5. The method of claim 1, wherein processing the RRC Connection message including the initial attach request indicator with the service request for a voice call origination comprises:

processing a RRC Connection setup complete message including the initial attach indicator with the service request for a voice call from the UE, wherein the UE is without authentication to the MME and wherein the service request is formatted in accordance with a Non Access Stratum (NAS) message format used as signaling between the UE and the MME.

6. The method of claim 1, wherein the cell redirection command includes a CS fallback command to attach to a second network and identification parameters of the second network.

7. User equipment (UE), comprising:
a wireless interface configured to connect to a first access network and a second access network; and
a processing circuit configured to:
generate a Radio Resource Control (RRC) Connection message without integrity protection including an NAS signaling message, wherein the NAS signaling message includes an initial attach indicator with a service request for a voice call;
transmit the RRC connection message without integrity protection to the first access network prior to having an established security context with a wireless base station in the first access network;
perform a Non-Access Stratum (NAS) authentication procedure with a mobility management entity (MME) in a core network for securing communications between the MME and the UE;
process an RRC connection release message from the mobility management entity (MME) via the first access network, wherein the RRC connection release message includes a cell redirection command in a payload with integrity protection; and
perform authentication of the cell redirection command in the payload of the RRC connection release message.

8. The UE of claim 7, wherein the processing circuit is further configured to:
determine the cell redirection command passes authentication; and
initiate an attach procedure with the second access network, wherein the second access network is identified in the cell redirection command.

9. The UE of claim 8, wherein the processing circuit is further configured to:
determine the cell redirection command fails authentication; and
abandon the attach procedure with the second access network.

10. The UE of claim 9, wherein the first access network includes an Evolved Universal Terrestrial Radio Access Network (E-UTRAN) and the second access network includes a GSM/EDGE Radio Access Network (GERAN).

11. The UE of claim 7, wherein the processing circuit is further configured to:
prior to receiving the cell redirection command, perform the NAS authentication procedure, wherein the NAS authentication procedure establishes an integrity key for authentication of the cell redirection command; and
authenticate the cell redirection command using the integrity key established during the NAS authentication procedure.

12. The UE of claim 11, wherein the processing circuit is further configured to authenticate the cell redirection command using the integrity key established during the NAS authentication procedure by at least one of:

authenticating a payload of the cell redirection command using the integrity key established during the authentication procedure, wherein the payload includes integrity protection with the integrity key; or
authenticating an NAS token in the cell redirection command, wherein the NAS token is generated using the integrity key.

13. The UE of claim 7, wherein the processing circuit is further configured to:
process an attach accept message including a cell redirection policy field, wherein the cell redirection policy field informs whether cell redirection with integrity protection is supported; and
performing the cell redirection command in accordance with the cell redirection policy.

14. A control node in a core network, comprising:
a network interface configured to communicate signaling messages with user equipment (UE) via a base station in a first access network;
a processing device configured to:
receive an initial attach request message from the UE in the first access network prior to an NAS security context with the UE, wherein the initial connection message includes a service request for a voice call;
perform an NAS authentication procedure with the UE and generate an integrity key;
process the service request from the UE;
generate an NAS signaling message with integrity protection generated using the integrity key, wherein the NAS signaling message includes a cell redirection command; and
wherein the NAS signalling message is included in a payload of an RRC connection message for transmission to the UE.

15. The control node of claim 13, wherein the processing device is configured to perform the authentication procedure by:
performing an AKA procedure, wherein the AKA procedure establishes the integrity key with the UE.

16. The control node of claim 14, wherein the processing device is configured to generate the cell redirection command by:
generating the NAS signalling message with a CS fallback command included in a payload of the NAS signalling message; and
performing integrity protection of the payload of the NAS signalling message using the NAS integrity key.

17. The control node of claim 16, wherein the processing device is further configured to:
receive the initial attach request with the service request from the UE when the UE is in an idle mode; and
after performing the NAS authentication procedure, process the service request from the UE by authenticating the service request from the UE using the integrity key.

18. The control node of claim 17, wherein the control node is an MME node in an evolved packet core (EPC) network configured to communicate NAS signaling messages with the UE.

19. The control node of claim 17, wherein the processing device is further configured to:
generate an attach accept message including a cell redirection policy field or parameter, wherein the cell redirection policy field informs whether cell redirection with integrity protection is supported.

* * * * *